(12) United States Patent
Grieser-Schmitz et al.

(10) Patent No.: US 8,432,060 B2
(45) Date of Patent: Apr. 30, 2013

(54) DEVICE FOR THE ELECTRIC ACTUATION OF A SAFETY-CRITICAL SYSTEM

(75) Inventors: Stefan Grieser-Schmitz, Koblenz (DE);
Werner Scheider, Monreal (DE)

(73) Assignee: Lucas Automotive GmbH, Koblenz (DE)

( * ) Notice: Subject to any disclaimer, the term of this patent is extended or adjusted under 35 U.S.C. 154(b) by 172 days.

(21) Appl. No.: 12/744,774

(22) PCT Filed: Nov. 26, 2008

(86) PCT No.: PCT/EP2008/010029
§ 371 (c)(1),
(2), (4) Date: May 26, 2010

(87) PCT Pub. No.: WO2009/068264
PCT Pub. Date: Jun. 4, 2009

(65) Prior Publication Data
US 2010/0314225 A1    Dec. 16, 2010

(30) Foreign Application Priority Data

Nov. 26, 2007   (DE) .................. 10 2007 057 199

(51) Int. Cl.
*B60L 1/00*       (2006.01)
*B60L 3/00*       (2006.01)
*H02G 3/00*       (2006.01)

(52) U.S. Cl.
USPC .......... 307/10.1; 307/112; 307/127; 200/10 R (58) Field of Classification Search .......... None
See application file for complete search history.

(56) References Cited

U.S. PATENT DOCUMENTS

| 3,720,872 A * | 3/1973 | Russell et al. ............... 324/133 |
| 4,076,093 A * | 2/1978 | Mizuno .......................... 180/286 |
| 5,237,211 A * | 8/1993 | Tanaka et al. ................. 327/403 |
| 5,473,203 A | 12/1995 | Umemura |
| 5,630,489 A * | 5/1997 | Bebernes .................. 192/219.4 |
| 5,714,852 A | 2/1998 | Enderich |
| 2003/0015921 A1* | 1/2003 | Kumayasu et al. ........... 307/131 |
| 2009/0090610 A1* | 4/2009 | Grimm et al. ................ 200/520 |

FOREIGN PATENT DOCUMENTS

| DE | 19962556 A1 | 7/2001 |
| DE | 102006009729 A1 | 9/2007 |
| EP | 1447830 A1 | 8/2004 |
| WO | 9803963 A1 | 1/1998 |
| WO | 0029268 A1 | 5/2000 |

* cited by examiner

*Primary Examiner* — Rexford Barnie
*Assistant Examiner* — Toan Vu
(74) *Attorney, Agent, or Firm* — MacMillan, Sobanski & Todd, LLC (57) ABSTRACT

For a device for the electrical actuation of a safety-critical system, having at least two terminals, at least one switch, an operator control element, by means of which at least two operating states for the system are selectable, by means of which switching positions of the at least one switch are determined, it is proposed that at least one current direction element is provided, so that for at least one of the at least two operating states a unidirectional current flow occurs between the at least two terminals.

11 Claims, 9 Drawing Sheets

"Neutral"

Fig. 1b

"Apply"

Fig. 1c

"Release"

| Operating state "Neutral" | | | | | | | | |
|---|---|---|---|---|---|---|---|---|
| | Control signal/status | | | | Terminal/potential | | | |
| Cycle | X1 | X2 | X3 | X4 | A1 | A2 | A3 | A4 |
| 1. | On | Off | Off | Off | High | Low | Low | High |
| 2. | Off | On | Off | Off | Low | High | Low | High |
| 3. | Off | Off | On | Off | Low | Low | High | Low |
| 4. | Off | Off | Off | On | Low | Low | Low | High |

Fig. 4a

| Operating state "Apply" | | | | | | | | |
|---|---|---|---|---|---|---|---|---|
| Cycle | Control signal/status | | | | Terminal/potential | | | |
| | X1 | X2 | X3 | X4 | A1 | A2 | A3 | A4 |
| 1. | On | Off | Off | Off | High | Low | Low | Low |
| 2. | Off | On | Off | Off | Low | High | Low | Low |
| 3. | Off | Off | On | Off | Low | High | High | Low |
| 4. | Off | Off | Off | On | High | Low | Low | High |

Fig. 4b

| Operating state "Release" | | | | | | | | |
|---|---|---|---|---|---|---|---|---|
| | Control signal/status | | | | Terminal/potential | | | |
| Cycle | X1 | X2 | X3 | X4 | A1 | A2 | A3 | A4 |
| 1. | On | Off | Off | Off | High | Low | Low | High |
| 2. | Off | On | Off | Off | Low | High | High | Low |
| 3. | Off | Off | On | Off | Low | High | High | Low |
| 4. | Off | Off | Off | On | High | Low | Low | High |

Fig. 4c

"Neutral"

Fig. 5b

"Apply"

Fig. 5c

"Release"

"Neutral"

Fig. 6b

"Apply"

Fig. 6c

"Release"

DEVICE FOR THE ELECTRIC ACTUATION OF A SAFETY-CRITICAL SYSTEM

CROSS-REFERENCE TO RELATED APPLICATIONS

This application is a national stage of International Application No. PCT/EP2008/010029 filed Nov. 26, 2008, the disclosures of which are incorporated herein by reference, and which claimed priority to German Patent Application No. 10 2007 057 199.4 filed Nov. 26, 2007, the disclosures of which are incorporated herein by reference.

BACKGROUND OF THE INVENTION

The present invention relates to a device for the electrical actuation of a safety-critical system. In the background art such a device is known from EP 1 447 830 A1. For secure wired coding of three different switching states, this device has two tiers of switches actuable in a coupled manner, by means of which six connecting leads may be switched into three different connection patterns. As the connection patterns associated with various actions and/or states differ in all of the connection pairs of the connecting leads, each connection pattern is already identifiable from a correct connection pair.

Such an electrical device is further known from DE 199 62 556 A1. In this device too, the electrical connection is effected by means of six switching lines, by means of which the three different switching states may be scanned. However, compared to the device known from EP 1 447 830 A1, the '556 device device additionally comprises a configuration with current direction elements, so that for each switching state a unidirectional current flow arises between the terminals.

One drawback is that manufacture and installation of the known devices entails a high technical outlay and is therefore costly. The reasons for this are above all that, firstly, in order to switch the three different connection patterns a total of six switches have to be coupled and actuated. Secondly, in order to connect to the devices to an electronic control unit a total of six electric terminals have to be provided and a total of six electric lines have to be installed. Thirdly, reliable scanning of the connection patterns for the electronic control unit, because of the total of six electric terminals, entails a correspondingly high outlay for circuitry and software. Therefore it would be desirable to provide a simpler electrical activation device.

BRIEF SUMMARY OF THE INVENTION

The present invention relates to a device for the electrical actuation of a safety-critical system, having at least two terminals, at least one switch, an operator control element, by means of which at least two operating states for the system are selectable, by means of which switching positions of the at least one switch are determined, wherein at least one current direction element is provided so that for at least one of the at least two operating states a unidirectional current flow occurs between the at least two terminals.

The underlying object of the invention is accordingly further to develop an initially described device for the electrical actuation of a safety-critical system such that it is improved in terms of the previously described drawbacks and exhibits a high redundancy and fault tolerance.

For this purpose, according to a first aspect of the invention for an initially described device for the electrical actuation of a safety-critical system it is proposed that the unidirectional current flow between the at least two terminals occurs for one operating state in the direction from the first to the second terminal and for a further operating state in reverse direction from the second to the first terminal.

According to a second aspect of the invention, for an initially described device it is proposed that the unidirectional current flow between the at least two terminals occurs for one operating state in the direction from the first to the second terminal or conversely and that for a further operating state a bidirectional or no current flow occurs between the at least two terminals.

The invention is notable for the advantage that the operating states selected by means of the operator control element may be safely and reliably determined and/or identified from different potentials that arise at the terminals. For, by means of the at least one current direction element for at least one operating state a unidirectional current flow between the at least two terminals is realized, as a result of which for each operating state different potentials arise at the at least two terminals.

In an advantageous manner, the at least one switch has at least two switching positions, wherein in each switching position either a unidirectional or a bidirectional current flow occurs between the at least two terminals. The effect thereby achieved is that at the at least two terminals exclusively defined potentials may arise, which are therefore predetermined in order to be able to be precisely determined and/or identified.

Furthermore, in an advantageous manner at least two switches may be connected in series. A possible scenario: assuming that two switches each having two switching positions are connected in series and that two current direction elements are provided, then between two terminals a bidirectional as well as two oppositely directed unidirectional current flows may occur, on the basis of which already three operating states are accurately distinguished.

If, in order to increase the system security further, the at least one switch is of an at least singly redundant design, then—taking the previous possible scenario further—this leads to a device according to the invention that is of a redundant design, i.e. comprises four terminals, four switches and four current direction elements and is able to distinguish three operating states. This makes the major advantage, which a device according to the invention offers over the devices known from EP 1 447 830 A1 and DE 199 62 556 A1, emphatically clear.

The invention further relates to a safety-critical system, in particular to an electromechanical parking brake system for a motor vehicle, for the electrical actuation of which a device according to the invention is provided. In this case, the at least two terminals of the device according to the invention are electrically connected to an electronic control unit that carries out open- and/or closed-loop control of the system in accordance with the operating state selected at the operator control element.

The system comprises an evaluation circuit, which at the at least two terminals sets a predetermined potential in order to evaluate the potentials consequently arising at the at least two terminals.

In a preferred manner the setting of a predetermined potential at the at least two terminals connections occurs in a predetermined cycle.

The evaluation of the potentials arising at the at least two terminals is effected in order to ascertain whether there is a conformity with the operating state selected at the operator control element, in order optionally to enable an error detection, error analysis and error control procedure to be carried out.

Other advantages of this invention will become apparent to those skilled in the art from the following detailed description of the preferred embodiments, when read in light of the accompanying drawings.

DETAILED DESCRIPTION OF THE INVENTION

Figure 1A:
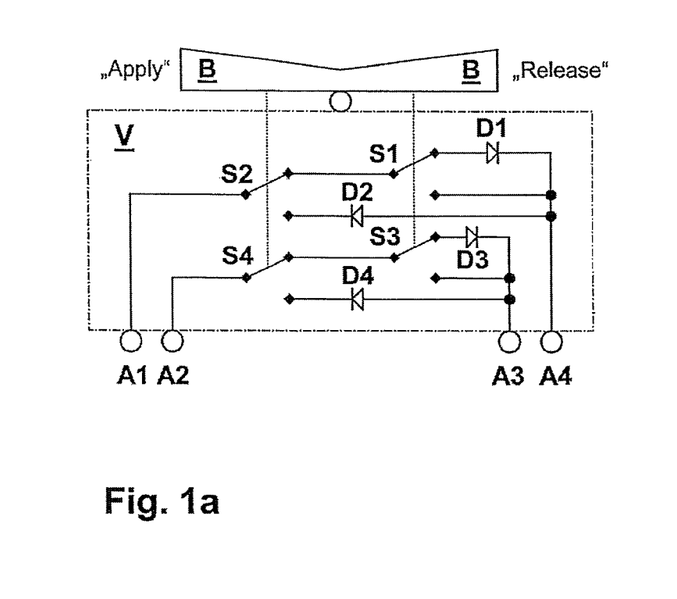
FIGS. 1a to 1d illustrate a first embodiment of a device according to the invention.

For a first embodiment of a device V according to the invention for the electrical actuation of a safety-critical system according to FIG. 1a, first of all two terminals A1 and A4 are considered. For electrically connecting the terminals A1 and A4 two switches S1 and S2 are provided, which are connected in series and each have two switching positions. In order to determine the switching positions of the two switches S1 and S2, the two switches S1 and S2 are operationally coupled to an operator control element B, by means of which the following three operating states are selectable for the system:

(i.) For a first operating state the two switches S1 and S2 are situated, as represented in FIG. 1a, in their top switching position so that there is an electrical connection by means of a current direction element D1 (for example a diode), which allows a unidirectional current flow only in the direction from the terminal A1 to the terminal A4 and blocks a current flow in the direction from the terminal A4 to the terminal A1.

(ii.) For a second operating state the switch S2 is situated in its bottom switching position, so that independently of the switching position, in which the switch S1 is situated, there is an electrical connection by means of a current directional element D2 (for example a diode), which allows a unidirectional current flow only in the direction from the terminal A4 to the terminal A1 and blocks a current flow in the direction from the terminal A1 to the terminal A4.

(iii.) For a third operating state the switch S2 is situated in its top switching position and the switch S1 in its bottom switching position, so that there is a direct electrical connection between the terminals A1 and A4 that allows a bidirectional current flow, i.e. both in the direction from the terminal A4 to the terminal A1 and in the direction from the terminal A1 to the terminal A4.

The device V according to the invention according to FIG. 1a further comprises two terminals A2 and A3, for the electrical connection of which two switches S3 and S4 as well as two current direction elements D3 and D4 (for example diodes) are provided. The components S3, S4 and D3, D4 connected up between the terminals A2 and A3 are not only identical to the components S1, S2 and D1, D2 connected up between the terminals A1 and A4 but are also configured in the same manner, as is represented in FIG. 1a. The switches S3 and S4 are also operationally coupled to the operator control element B in such a way that the switch S3 is connected in parallel to the switch S1 and the switch S4 is connected in parallel to the switch S2.

Viewed as a whole, the device V according to the invention according to FIG. 1a is therefore notable for a single-redundancy configuration, by means of which three different operating states for a safety-critical system are selectable by means of only four terminals A1, A2, A3 and A4.

Figure 1B:
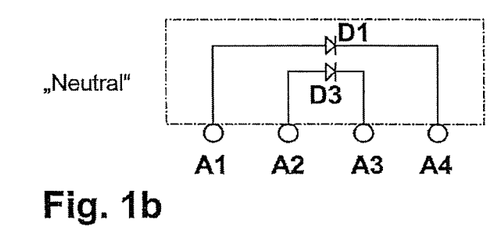
Figure 1C:
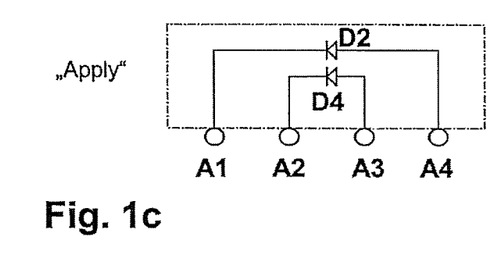
Figure 1D:
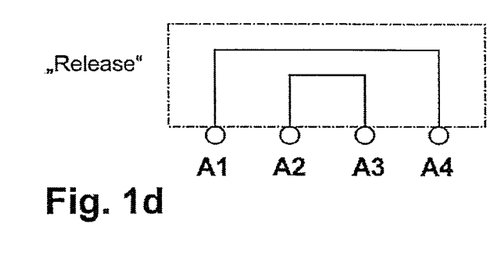

FIGS. 1b to 1d show in each case an equivalent circuit diagram for the three operating states that are selectable for the device according to the invention according to FIG. 1a, namely:

(i.) which by means of the current directional elements D1 and/or D3 allows only a unidirectional current flow in the direction from the terminal A1 to the terminal A4 and/or from the terminal A2 to the terminal A3.

(ii.) FIG. 1c shows the second operating state described as "Apply", which by means of the current direction elements D2 and/or D4 allows only a unidirectional current flow in the direction from the terminal A4 to the terminal A1 and/or from the terminal A3 to the terminal A2.

(iii.) FIG. 1d shows the third operating state described as "Release", which allows a bidirectional current flow between the terminals A1 and A4 and/or the terminals A2 and A3.

As a safety-critical system for a possible use of the device V according to the invention reference is to be made to an electromechanical parking or immobilizing brake system (EPB) for a motor vehicle. As a driver carries out the actuation of the EPB by means of an electrical switching device instead of by means of a mechanical handbrake lever, it is absolutely essential that not just the switching device itself but above all the electric lines emanating from the terminals of this switching device are monitored constantly for errors, such as for example interruption or short-circuit.

For an EPB, a momentary-contact tumbler switch for example might be used as operator control element B, which for example under the action of a spring arrangement occupies its normal position represented in FIG. 1a, which corresponds to the first operating state "Neutral". If the operator control element B, starting from its normal position, is actuated at its left side, this corresponds to the second operating state "Apply", which may mean for example an activation of the EPB. If the operator control element B, starting from its normal position, is actuated at its right side, this corresponds to the third operating state "Release", which may mean for example a release of the EPB.

Figure 2:
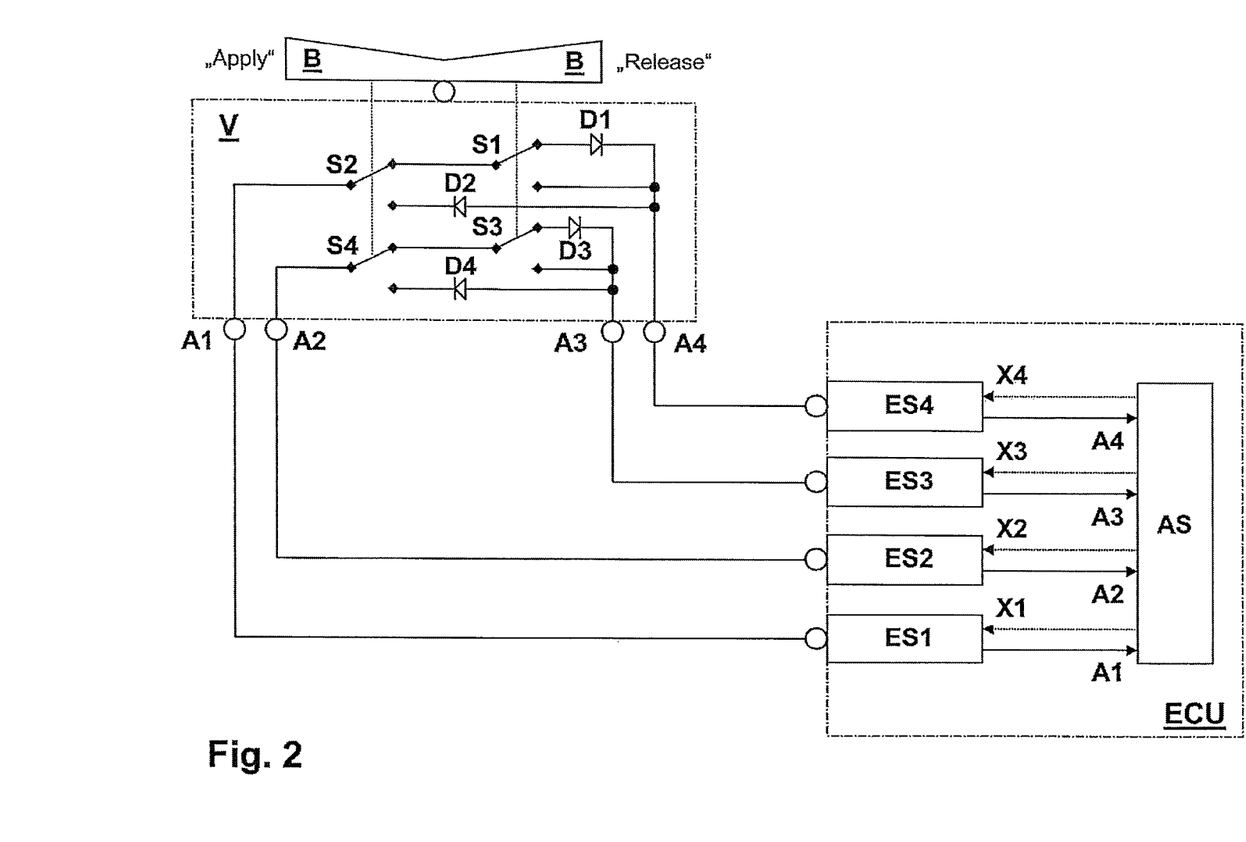
FIG. 2 is a schematic diagram of a safety-critical system having a device according to the invention according to FIGS. 1a to 1d.

In FIG. 2 a safety-critical system having a device V according to the invention according to FIGS. 1a to 1d is diagrammatically represented. In this case, the four terminals A1, A2, A3 and A4 are electrically connected by lines, which are not denoted in detail, to an electronic control unit (ECU). The ECU by means of an evaluation circuit AS evaluates the signals supplied from the device V according to the invention to the terminals A1, A2, A3 and A4 in order to identify an operating state selected at the operator control element B, and in order to carry out open- and/or closed-loop control of the system in accordance with the operating state. The system, in addition to the evaluation circuit AS, further comprises input circuits ES1, ES2, ES3 and ES4, which are preferably, as diagrammatically represented in FIG. 2, a component part of the ECU. The evaluation circuit AS is at a higher level than the input circuits ES1, ES2, ES3 and ES4 and for each of these provides control signals X1, X2, X3 and X4 respectively.

An input circuit ES1, ES2, ES3 and ES4 is associated with each of the terminals A1, A2, A3 and A4. The input circuits ES1, ES2, ES3 and ES4 are each of an identical configuration, which is diagrammatically shown in FIG. 3 by way of an input circuit ES . . . that is associated with a terminal A . . . .

Figure 3:
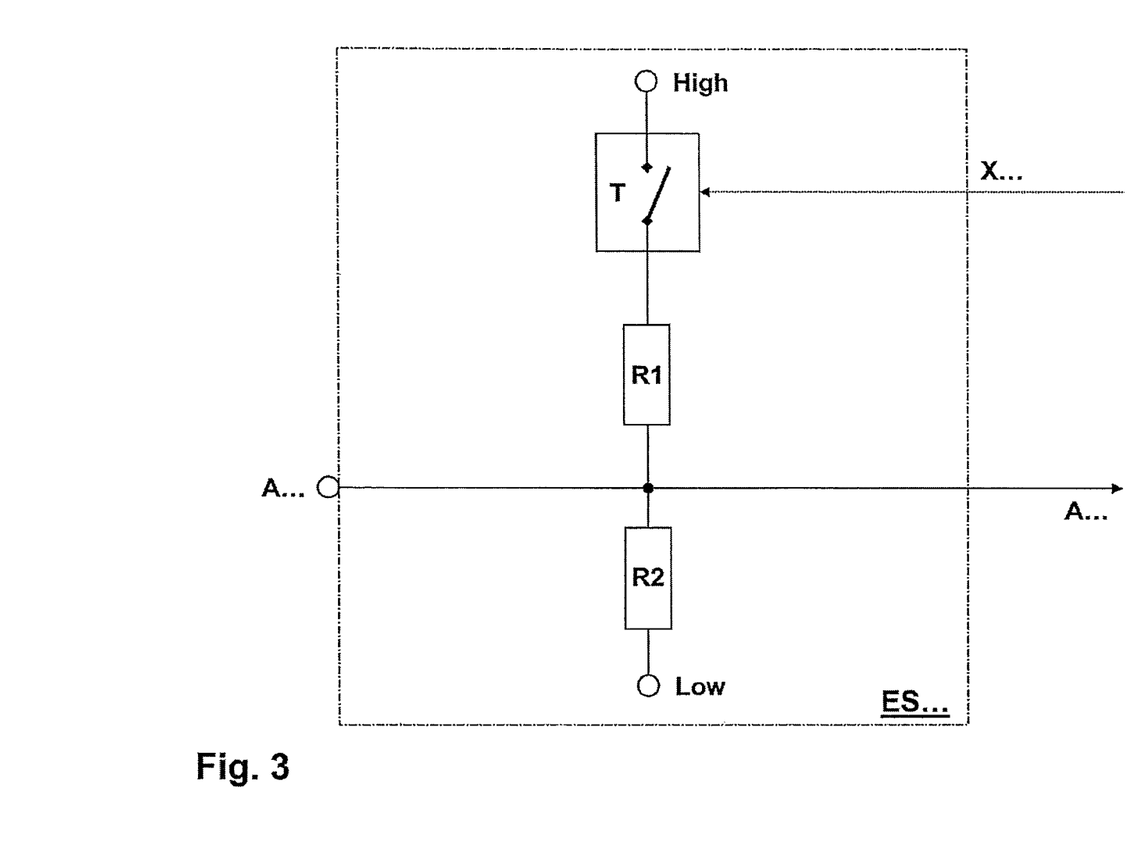
FIG. 3 is a schematic diagram of the configuration of an evaluation circuit for a safety-critical system according to FIG. 2, FIGS. 4a to 4c are evaluation tables for operating states of a safety-critical system according to FIG. 2, FIGS. 5a to 5d illustrate a second embodiment of a device according to the invention.

An input circuit ES . . . is geared to set a predetermined potential, either "Low" or "High", for the terminal A . . . associated with it. This is effected by means of the control signal X . . . , which is supplied to it by the evaluation circuit AS and which controls an electronic switching element T (for example a transistor or relay). If the control signal X . . . has the status "On", the electronic switching element T occupies its closed state, in which the terminal A . . . is connected by a low-value resistor element R1 to "High", i.e. a positive potential, for example the supply voltage of the ECU; if, on the other hand, the control signal X . . . has the status "Off", then the electronic switching element T occupies its blocked state, in which the terminal A . . . is connected by a high-value resistor element R2 to "Low", i.e. a negative potential or zero, for example to ground.

Figure 4A:
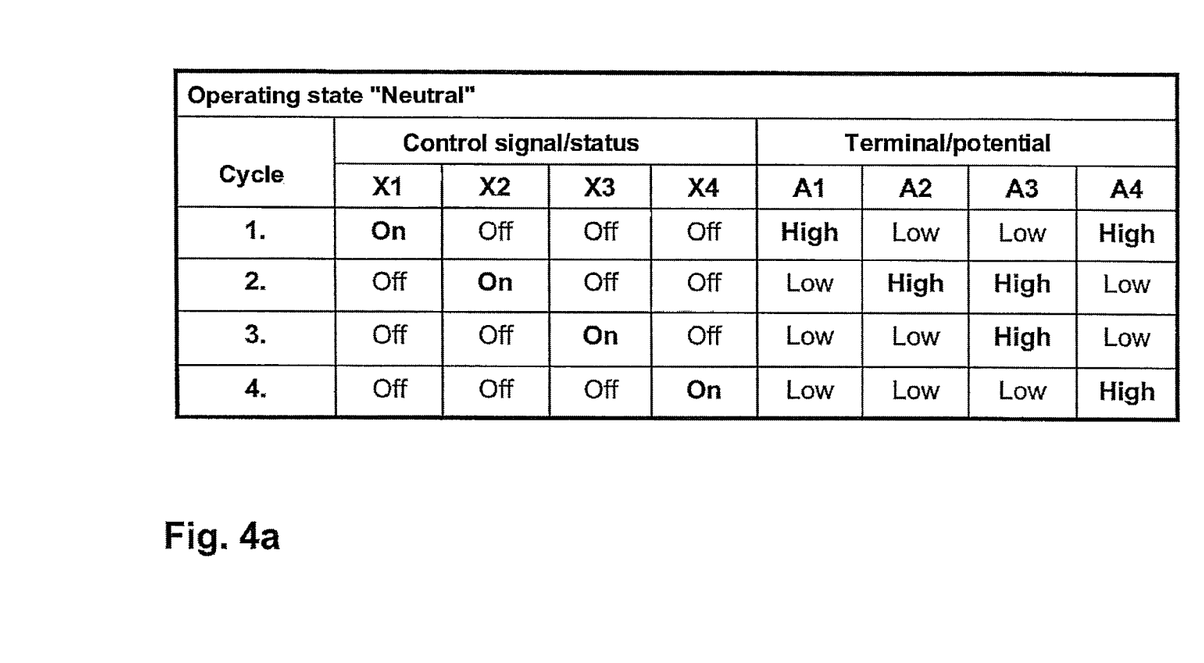

The setting of a predetermined potential at each of the terminals A1, A2, A3 and A4 occurs cyclically. For this purpose, the evaluation circuit AS emits a predetermined pattern of control signals X1, X2, X3 and X4 per cycle. Then, still in the same cycle the evaluation circuit AS evaluates the signals output at the terminals A1, A2, A3 and A4 and saves these before the procedure continues with the next cycle. Once all of the cycles that are to be run through in order to determine an operating state have been executed, they are jointly evaluated in order to identify the operating state selected at the operator control element B. A good compromise between high security, on the one hand, and a high evaluation speed, on the other hand, is reached if per cycle the potential "High" is set always only at one of the terminals A1, A2, A3 or A4, while the respective other terminals remain at the potential "Low". In this case, i.e. in the case of a device V according to the invention having four terminals A1, A2, A3 and A4, in order to identify the operating state precisely four cycles are to be executed and then evaluated, as emerges from the evaluation tables according to FIGS. 4a to 4c. In particular:

(i.) FIG. 4a shows the evaluation table for identifying the operating state "Neutral". Four cycles are executed, wherein always only one control signal having the status "On" is output per cycle—here, in the order X1, X2, X3, X4. The potential "High" accordingly arises at the associated terminal per cycle—here, in the order A1, A2, A3, A4. Furthermore, the potential "High" arises in each case in the first cycle at the terminal A4 and in the second cycle at the terminal A3. This is because (according to FIG. 1b) in the first cycle the current direction element D1 blocks a current flow from the terminal A4 to the terminal A1 and in the second cycle the current direction element D3 blocks a current flow from the terminal A3 to the terminal A2.

Figure 4B:
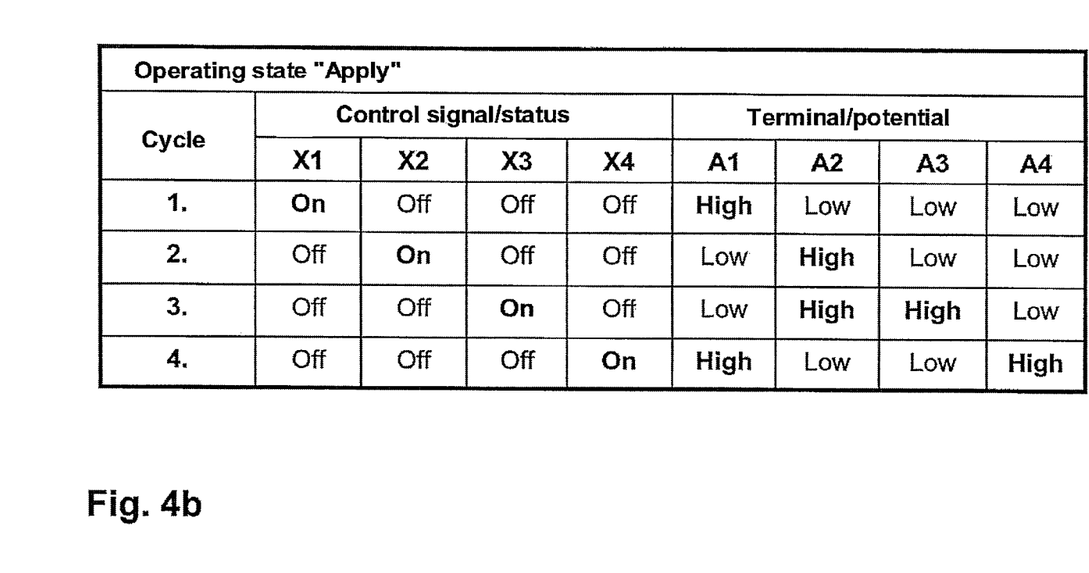

(ii.) FIG. 4b shows the evaluation table for identifying the operating state "Apply". Four cycles are executed, wherein always only one control signal having the status "On" is output per cycle—here, in the order X1, X2, X3, X4. The potential "High" accordingly arises at the associated terminal per cycle—here, in the order A1, A2, A3, A4. Furthermore, the potential "High" arises in each case in the third cycle at the terminal A2 and in the fourth cycle at the terminal A3. This is because (according to FIG. 1c) in the third cycle the current direction element D4 blocks a current flow from the terminal A2 to the terminal A3 and in the fourth cycle the current direction element D2 blocks a current flow from the terminal A1 to the terminal A4.

Figure 4C:
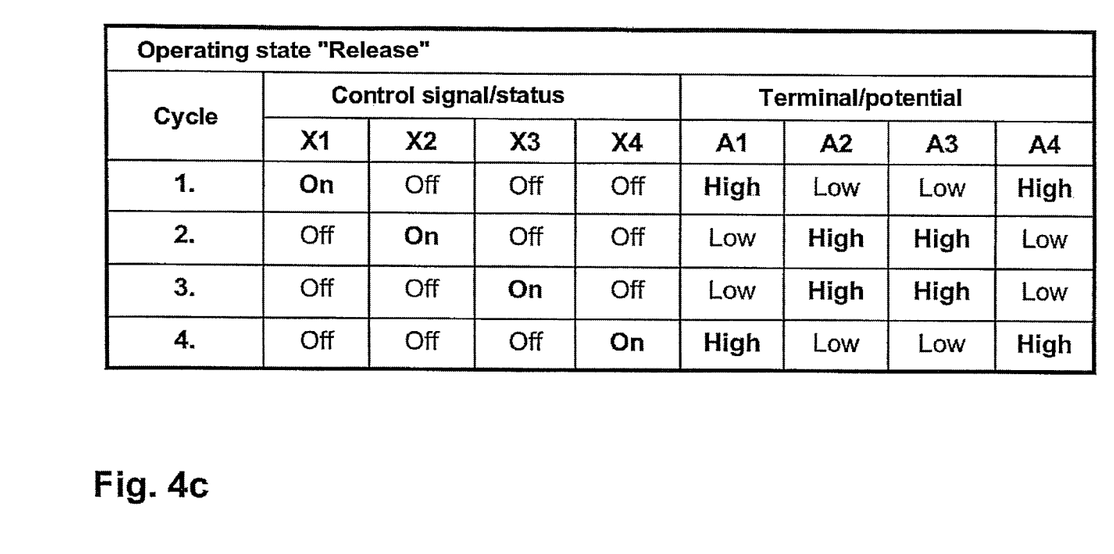

(iii.) FIG. 4c shows the evaluation table for identifying the operating state "Release". Four cycles are executed, wherein always only one control signal having the status "On" is output per cycle—here, in the order X1, X2, X3, X4. The potential "High" accordingly arises at the associated terminal per cycle—here, in the order A1, A2, A3, A4. Furthermore, the potential "High" arises in each case in the first cycle at the terminal A4, in the second cycle at the terminal A3, in the third cycle at the terminal A2 and in the fourth cycle at the terminal A1. This is because (according to FIG. 1d) there is no current direction element acting between the terminals A1 and A4 or between the terminals A2 and A3.

In the event of variations from the potentials "Low"/ "High" indicated for the terminals A1, A2, A3, A4 in the evaluation tables, these variations may then serve as a basis for carrying out a precise error detection, error analysis and error control procedure within the ECU. Several examples of this are considered by way of the evaluation table for identifying the operating state "Neutral" according to FIG. 4a:

The error "terminal A1 shorted to ground" is identified if in the first cycle the potential "Low" and not "High" arises in each case at the terminals A1 and A4; the error "terminal A4 shorted to ground" is identified if in the fourth cycle the potential "Low" and not "High" arises at the terminal A4; the error "terminal A1 shorted to supply voltage" is identified if in the second cycle the potential "High" and not "Low" arises in each case at the terminals A1 and A4; the error "terminal A4 shorted to supply voltage" is identified if in the fourth cycle the potential "High" and not "Low" arises at the terminal A4.

The ECU may in dependence upon the results of the error control procedure initiate suitable measures, such as for example the output of audible and/or visual and/or haptic warnings—in the case of an EPB to the driver, transfer of the safety-critical system to a defined safe operating state, storage of the identified errors for diagnostic and/or workshop purposes. Ideally, for this purpose not only are the individual circuits in the ECU designed as hardware but the ECU in a currently conventional manner comprises microcomputers, on which the provided functions may be implemented as software. It may moreover be provided that the ECU also communicates with electronic control units of other systems, for example in the case of an EPB with the electronically controlled service brake system of the motor vehicle.

Figure 5A:
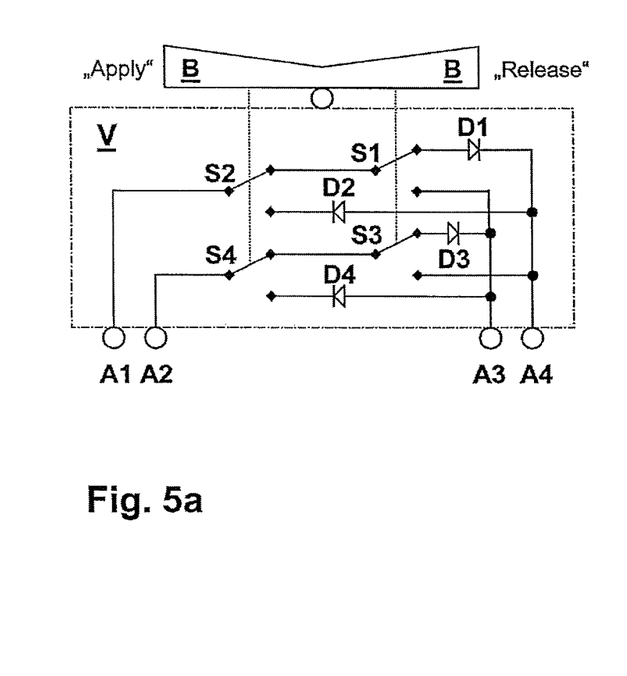

FIG. 5a shows a second embodiment of a device V according to the invention, for which at first three terminals A1, A3 and A4 are considered. For electrically connecting the terminals A1 and A4 and/or A3 two switches S1 and S2 are provided, which each have two switching positions. In order to determine the switching positions of the two switches S1 and S2, the two switches S1 and S2 are operationally coupled to an operator control element B, by means of which the following three operating states are selectable for the system:

(i.) For a first operating state the two switches S1 and S2 are situated, as represented in FIG. 5a, in their top switching position so that there is an electrical connection by means of a current direction element D1, which allows a unidirectional current flow only in the direction from the terminal A1 to the terminal A4 and blocks a current flow in the direction from the terminal A4 to the terminal A1.

(ii.) For a second operating state the switch S2 is situated in its bottom switching position so that independently of the switching position, in which the switch S1 is situated, there is an electrical connection by means of a current direction element D2, which allows a unidirectional current flow only in the direction from the terminal A4 to the terminal A1 and blocks a current flow in the direction from the terminal A1 to the terminal A4.
(iii.) For a third operating state the switch S2 is situated in its top switching position and the switch S1 in its bottom switching position, so that there is a direct electrical connection between the terminals A1 and A3 that allows a bidirectional current flow, i.e. both in the direction from the terminal A3 to the terminal A1 and in the direction from the terminal A1 to the terminal A3.

The device V according to the invention according to FIG. 5a further comprises a terminal A2, for the electrical connection of which to the terminal A3 and/or A4 two switches S3 and S4 as well as two current direction elements D3 and D4 are provided, as represented in FIG. 5a. The switches S3 and S4 are operationally coupled to the operator control element B in such a way that the switch S3 is connected in parallel to the switch S1 and the switch S4 is connected in parallel to the switch S2. Thus, the device V according to the invention according to FIG. 5a is also notable for a single-redundancy configuration, by means of which three different operating states for a safety-critical system are selectable by means of only four terminals A1, A2, A3 and A4.

Figure 5B:
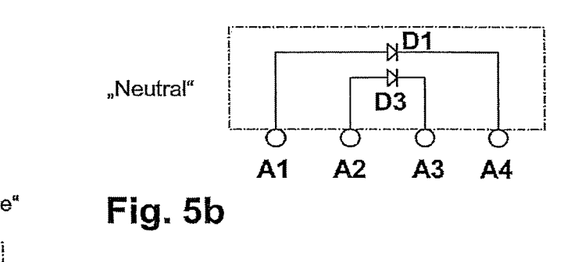
Figure 5C:
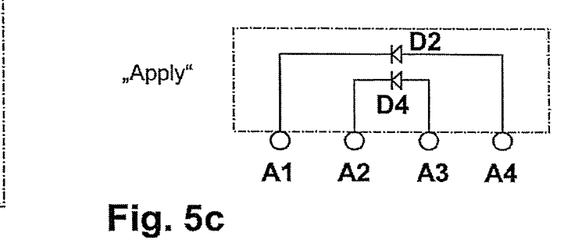
Figure 5D:
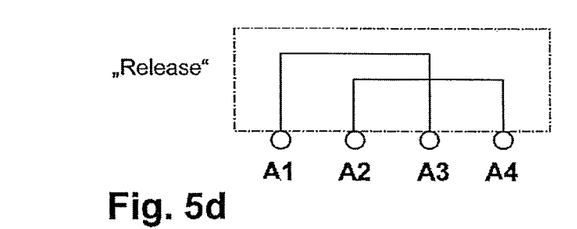

FIGS. 5b to 5d show in each case an equivalent circuit diagram for the three operating states that are selectable for the device according to the invention according to FIG. 5a, namely:
(i.) FIG. 5b shows the first operated state described as "Neutral", which by means of the current direction elements D1 and/or D3 allows only a unidirectional current flow in the direction from the terminal A1 to the terminal A4 and/or from the terminal A2 to the terminal A3.
(ii.) FIG. 5c shows the second operating state described as "Apply", which by means of the current direction elements D2 and/or D4 allows only a unidirectional current flow in the direction from the terminal A4 to the terminal A1 and/or from the terminal A3 to the terminal A2.
(iii.) FIG. 5d shows the third operating state described as "Release", which allows a bidirectional current flow between the terminals A1 and A3 and/or the terminals A2 and A4.

The difference from the first embodiment according to FIGS. 1a to 1d is therefore that for the third operating state described as "Release", as opposed to the other two operating states, the terminals A1, A2, A3 and A4 are crossed over in such a way that A1 is connected to A3 and A2 is connected to A4. The interconnection of the operating states thus produced enables an improved error control procedure of the operating state "Release".

Figure 6A:
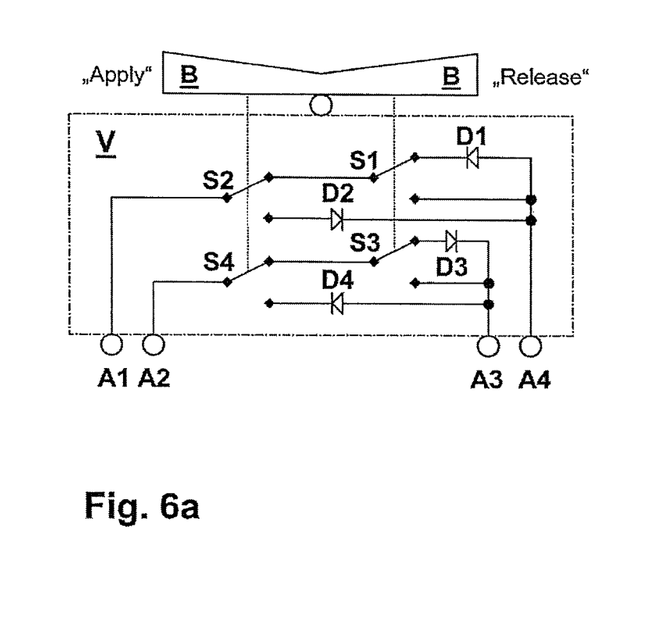
FIGS. 6a to 6d illustrate a third embodiment of a device according to the invention.

FIG. 6a shows a third embodiment of a device V according to the invention, for which at first two terminals A1 and A4 are considered. For electrically connecting the terminals A1 and A4 two switches S1 and S2 are provided, which each have two switching positions. In order to determine the switching positions of the two switches S1 and S2, the two switches S1 and S2 are operationally coupled to an operator control element B, by means of which the following three operating states are selectable for the system:
(i.) For a first operating state the two switches S1 and S2 are situated, as represented in FIG. 6a, in their top switching position so that there is an electrical connection by means of the current direction element D1, which allows a unidirectional current flow only in the direction from the terminal A4 to the terminal A1 and blocks a current flow in the direction from the terminal A1 to the terminal A4.
(ii.) For a second operating state the switch S2 is situated in its bottom switching position so that independently of the switching position, in which the switch S1 is situated, there is an electrical connection by means of the current direction element D2, which allows a unidirectional current flow only in the direction from the terminal A1 to the terminal A4 and blocks a current flow in the direction from the terminal A4 to the terminal A1.
(iii.) For a third operating state the switch S2 is situated in its top switching position and the switch S1 in its bottom switching position, so that there is a direct electrical connection between the terminals A1 and A4 that allows a bidirectional current flow, i.e. both in the direction from the terminal A4 to the terminal A1 and in the direction from the terminal A1 to the terminal A4.

The device V according to the invention according to FIG. 6a further comprises two terminals A2 and A3, for the electrical connection of which two switches S3 and S4 as well as two current direction elements D3 and D4 are provided. The components S3, S4 and D3, D4 connected up between the terminals A2 and A3 are not only identical to the components S1, S2 and D1, D2 connected up between the terminals A1 and A4 but are also configured in the same manner, as represented in FIG. 6a. The switches S3 and S4 are also operationally coupled to the operator control element in such a way that the switch S3 is connected in parallel to the switch S1 and the switch S4 is connected in parallel to the switch S2.

Viewed as a whole, the device V according to the invention according to FIG. 6a is therefore notable for a single-redundancy configuration, by means of which three different operating states for a safety-critical system are selectable by means of only four terminals A1, A2, A3 and A4.

Figure 6B:
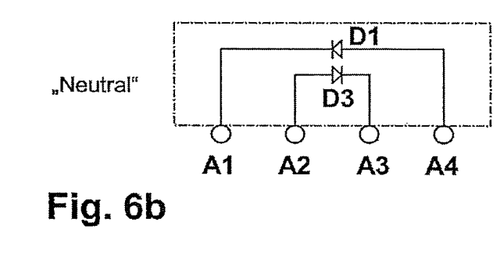
Figure 6C:
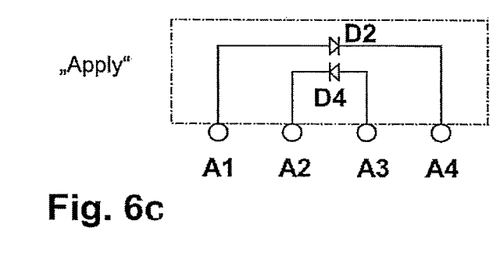
Figure 6D:
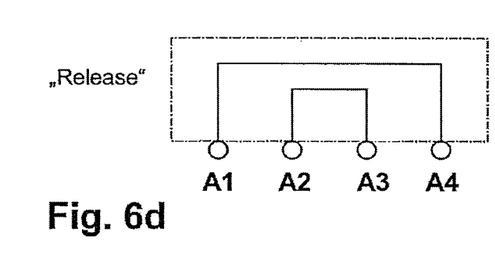

FIGS. 6b to 6d show in each case an equivalent circuit diagram for the three operating states that are selectable for the device according to the invention according to FIG. 6a, namely:
(i.) FIG. 6b shows the first operating state described as "Neutral", which by means of the current direction elements D1 and/or D3 allows only a unidirectional current flow in the direction from the terminal A4 to the terminal A1 and/or from the terminal A2 to the terminal A3.
(ii.) FIG. 6c shows the second operating state described as "Apply", which by means of the current direction elements D2 and/or D4 allows only a unidirectional current flow in the direction from the terminal A1 to the terminal A4 and/or from the terminal A3 to the terminal A2.
(iii.) FIG. 6d shows the third operating state described as "Release", which allows a bidirectional current flow between the terminals A1 and A4 and/or the terminals A2 and A3.

The difference from the first embodiment according to FIGS. 1a to 1d is therefore that the current direction elements D1 and D2 are arranged anti-parallel to one another, thereby achieving a decoupling of the operating states.

Figure 7:
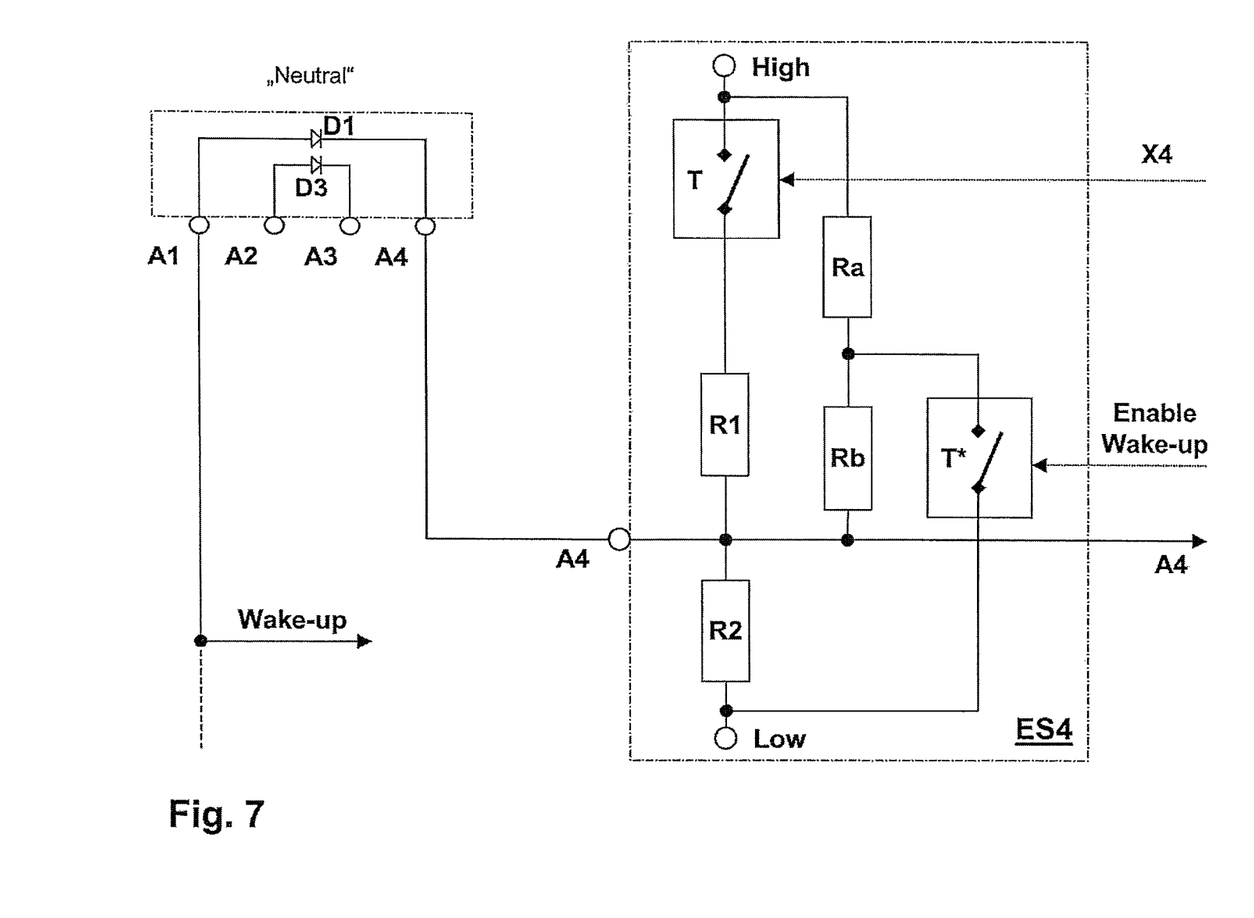
FIG. 7 illustrates a possible way of realizing an activation ("Wake-up") function in a device according to the invention.

FIG. 7 shows a possible way, in which a "Wake-up" function may be realized in a device according to the invention. The "Wake-up" function is used to reactivate the ECU in the deactivated or standby state upon an actuation of the operator control element B.

For this, the first embodiment according to FIGS. 1a to 1d is considered, wherein the activation of the switching operation ("Wake-up") is effected by means of the terminals A1 and A4. For this purpose, the input circuit ES4 is expanded by two resistor elements Ra and Rb as well as by a further electronic switching element T* (semiconductor switch, for example transistor or relay). The electronic switching element T* is activated by means of an "Enable Wake-up" control signal supplied by the ECU. If the electronic switching element T* is in its open state, the input circuit ES4 functions in the previously described manner because Rb is a high-value resistor element. If however the electronic switching element T* assumes its closed state, the terminal A4 is connected by Ra, which is likewise a high-value resistor element in the order of magnitude of Rb, to the potential "High". Consequently, in accordance with the operating state "Neutral" there arises at the terminal A4 the potential "High" and at the terminal A1 the potential "Low" (cf. FIG. 1b and FIG. 4a). If the operating state "Apply" (cf. FIG. 1c and FIG. 4b) or "Release" (cf. FIG. 1d and FIG. 4c) is then selected, at the terminal A1 the potential changes from "Low" to "High". This change of potential is picked up and evaluated as a "Wake-up" signal in the ECU in order to reactivate the ECU. As soon as a reactivation of the ECU has occurred, the control signal "Enable Wake-up" is cancelled and/or the electronic switching element T* is transferred to its open state to allow the device according to the invention to be used once more for its proper function.

The activation ("Wake-up") function may also be designed redundantly in that it is effected in parallel also via the terminals A2 and A3, i.e. the input circuit ES3 would have to be expanded in a similar manner to the input circuit ES4.

Advantageous values for the rating of the resistor elements may be: Ra~10 K ohms, Rb~10 k ohms, R1~0.5 k ohms and R2~1 k ohms.

Finally, it should additionally be mentioned that it is naturally within the discretion of the person skilled in the art to undertake modifications to the embodiments within the scope of the claims, this applying in particular to the number of switches, the number of switching positions thereof and the redundancy thereof, from which the number of operating states selectable for the system results.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A device for the electrical actuation of a safety-critical system comprising:
   an electrical switching device having at least two terminals;
   at least one switch disposed within the electrical switching device;
   an operator control element mounted upon the electrical switching device, by means of which at least two operating states for the system are selectable and by means of which switching positions of the at least one switch are determined; and
   at least one current direction element included within the electrical switching device so that for at least one of the at least two operating states, a unidirectional current flow occurs between the at least two terminals, with the unidirectional current flow between the at least two terminals occurring for one operating state in the direction from the first to the second terminal and for a further operating state in a reverse direction from the second to the first terminal;
   wherein the at least two terminals of the device are electrically connected to an electronic control unit for the safety critical system, in particular an electromechanical parking brake system for a motor vehicle, that carries out at least one of open- or closed-loop control of the safety critical system in accordance with the operating state selected at the operator control element.

2. The device according to claim 1, wherein the at least one switch has at least two switching positions, and further wherein in each switching position either a unidirectional or a bidirectional current flow occurs between the at least two terminals.

3. The device according to claim 2 including at least two switches connected in series.

4. The device according to claim 1, wherein the at least one switch is designed with at least a single redundancy.

5. The system according to claim 1, wherein the system also includes an evaluation circuit that sets a predetermined potential at the at least two terminals in order to evaluate the potentials consequently arising at the at least two terminals.

6. The system according to claim 5 wherein the setting of a predetermined potential at the at least two terminals occurs in a predetermined cycle.

7. The system according to claim 5, wherein the evaluation of the potentials arising at the at least two terminals is effected in order to ascertain whether there is a conformity with the operating state selected at the operator control element.

8. A device for the electrical actuation of a safety-critical system for an electromechanical locking brake system of a motor vehicle comprising:
   at least two terminals having a current direction element provided therebetween;
   at least two switches that have two switching positions;
   an operator control element by means of which two operating states for the system are selectable and by means of which the switching positions of the at least two switches are determined, wherein
   the at least two terminals are electrically connected to an electrical control unit that performs control or steering, respectively, of the system according to an operating state selected on the operator control element;
   in each switching position of the at least two serially connected switches, either a unidirectional current flow, a bidirectional current flow, or no current flow occurs between the at least two terminals such that either:
   a unidirectional current flow occurs between the at least two terminals through a basic switching position of a first and a second switch for an operating state in a direction from the first to the second terminal,
   a unidirectional current flow occurs through a changed switching position of one of the two switches from the second to the first terminal for a further operating state in opposite direction, or
   a bidirectional current flow or no current flow occurs between the first and the second terminal through another changed switching position of one of the two switches with respect to the basic switching position for a further operating state, and
   an evaluation circuit which sets a previously defined potential at the at least two terminals, in order to evaluate the resulting potentials at the at least two terminals.

9. The device according to claim 8, wherein the at least one switch is designed with at least a single redundancy.

10. The device according to claim 8, wherein the setting of a predetermined potential at the at least two terminals occurs in a predetermined cycle.

11. The device according to claim 8, wherein the evaluation of the potentials arising at the at least two terminals is effected in order to ascertain whether there is a conformity with the operating state selected at the operator control element.

* * * * *